Jan. 8, 1952     L. L. ROSE     2,582,069
JET PUMP
Filed Aug. 21, 1945
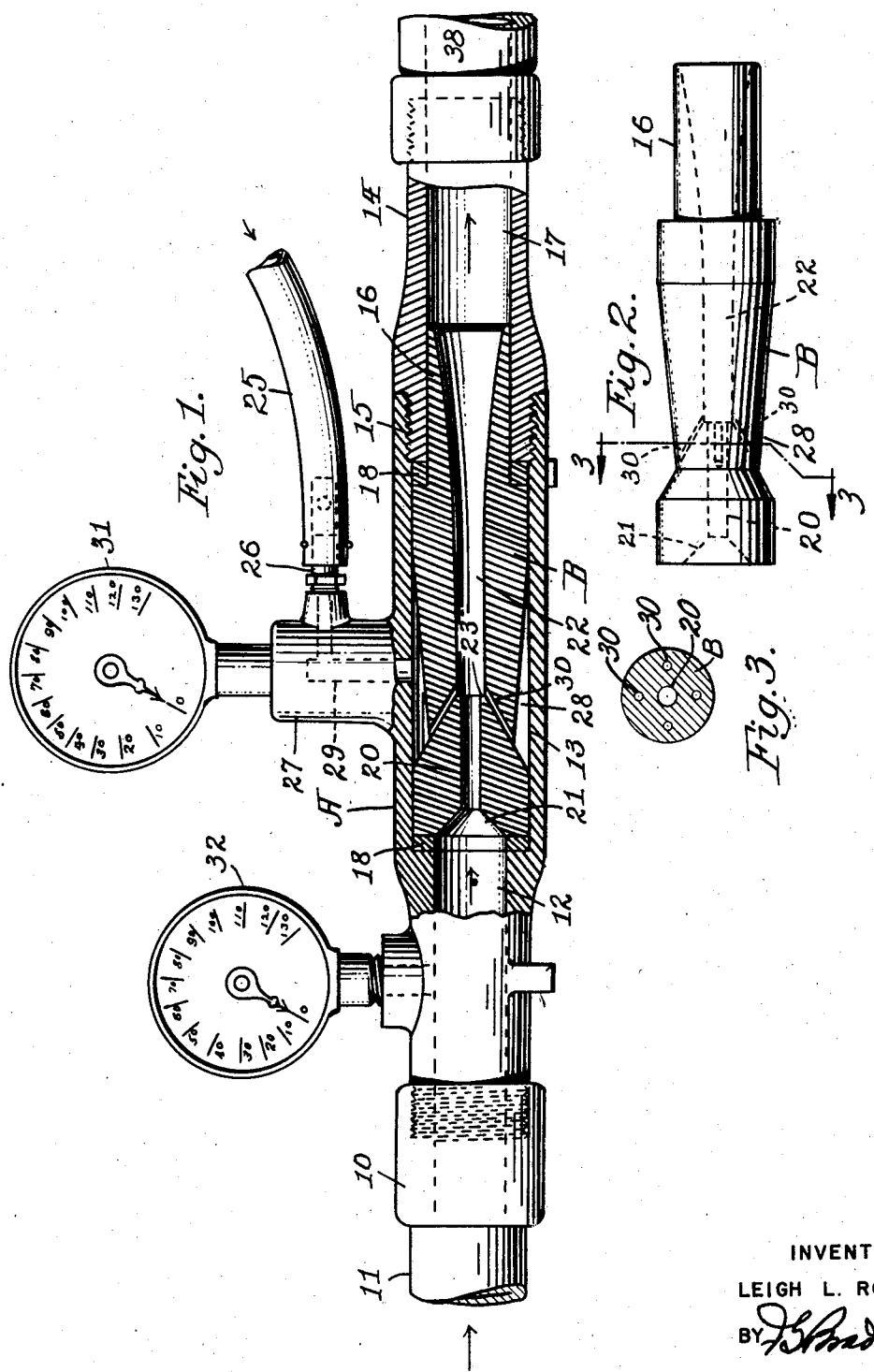
INVENTOR
LEIGH L. ROSE
BY
ATTORNEY Patented Jan. 8, 1952

2,582,069

UNITED STATES PATENT OFFICE 2,582,069

JET PUMP

Leigh L. Rose, Los Angeles, Calif.

Application August 21, 1945, Serial No. 611,857

1 Claim. (Cl. 103—262)

This invention relates to a mixing unit of that type by which liquid fertilizer, insecticide or gases are continuously admixed evenly in any predetermined proportion with a stream of water and the mixture thus produced is sprayed on flowers, grass, vegetable growth and any other vegetation. The apparatus is further designed for use in conjunction with sprinkling means such as garden hose, sprinkler systems, etc., and may be used effectively to fertilize or treat vegetation, correct acid or alkaline conditions of the soil and to apply liquid or gaseous insecticide remedies in conjunction with water furnished by ordinary water systems.

The primary object of my invention is to thoroughly mix the liquid fertilizer or other chemical or gas treating medium with a stream of water under pressure and to automatically regulate the proportion of the treating medium in accordance with any variation in pressure of the stream of water with which it is admixed.

A further object of my invention is the production of means for mixing liquid fertilizer or other treating medium with the stream of water which can be easily and quickly changed either to adopt the mixing apparatus more effectively to high or low pressures of the water with which the apparatus is used, such differences often occurring in water systems in a single or in different municipalities, or to adapt the mixing apparatus for use in mixing various types of liquid chemicals or gases.

Among still further objects is the production of apparatus of its kind which is simple and inexpensive in construction, easy to operate and highly effective in use.

In the accompanying drawings forming part of this specification, Fig. 1 is a side elevation of my improved mixing unit which is partly broken away and shown in central longitudinal section; Fig. 2 is a side elevation of the changeable filler by which the mixing unit may be converted for high or low water pressure use or for use in mixing various types of liquid chemicals or gases with a stream of water; Fig. 3 is a section taken on the line 3—3 of Fig. 2.

In the drawings, and with particular reference to Figs. 1 and 2, A represents a cylindrical casing through which a stream of water under the usual pressure provided by municipal or other sources of water supply is conducted, said casing being adapted to be connected by a suitable threaded coupling 10 with any suitable water supply duct such as 11. The casing is provided with an inlet passage 12 leading from the supply duct, said passage being enlarged to form a cylindrical chamber 13 in which a cylindrical mixing filler or core B of corresponding diameter is removably seated thorugh its forward end. The forward end of said body adjoining the filler is connected with a coupling 14 which is detachably secured thereto by the threaded connection 15.

The filler B is formed with a forward cylindrical nozzle 16 which corresponds in outer diameter with and projects into the longitudinal inner tubular passage 17 through the coupling 14. In this position the filler B is secured tightly between suitable packing rings 18 in the chamber 13 of said casing by the coupling 14. The filler is provided with an axially disposed inlet channel 20 which is of even diameter throughout its length and which is connected at its rearward end with the reduced end of a forwardly converging passage 21. This passage reduces the size of the stream of water under normal pressure which is admitted from the supply duct 11 into the inlet channel 20 in the filler.

The forward end of channel 20 is connected with the inner end of a forwardly extending passage 22 of greater diameter, the rearward portion of which for a portion of its length is of even and less diameter. This passage 22 is gradually enlarged by flaring forwardly and is connected with an enlarged forwardly extending duct 17 through the connector 14. The rearward end of passage 22 is larger at its junction 23 with the channel 20 than the said channel 20 at which point liquid fertilizer, chemical or gas is admixed evenly with the flowing stream of water under pressure traversing the water channel through the filler as will be hereinafter described.

The force of the stream of water under normal pressure issueing from a suitable water supply system is utilized to introduce and thoroughly mix in the desired proportion, liquid fertilizer, insecticide or gas with said stream and to spray the mixture thus produced on any vegetation it is desired to treat. This mixture is maintained uniform by my improved mixing unit irrespective of fluctuations of water pressure such as usually occur in water systems and the mixture is produced in thoroughly mixed condition whereby more efficient results are produced by the use of liquid fertilizer, insecticide or gas treating medium.

My improved mixing unit may be connected with a suitable receptacle (not shown) containing liquid fertilizer, insecticide or gas through a suitable supply pipe or hose 25. The latter is coupled to nipple 26 (Fig. 1), which extends from a lateral branch 27 extending from the side of the casing A. The body of the filler B between its end portions is formed with a rearwardly tapering depression which in cooperation with the casing A provides an annular chamber 28. A branch 27 on the casing has a passage 29 entering said chamber, the outer portion of said passage being connected by the nipple 26 and hose 25 with a suitable source of fluid. In this manner any suitable fluid in the form of liquid or gas is admitted into said chamber. The diameter of passage 22 being greater than the diameter of passage 20 at the junction 23 between said passages causes violent turbulent agitation of the stream of fluid adjacent to said junction. At this junction an annular cluster of forwardly converging finely drilled feed channels 30, leading from chamber 28, enter the passage 22. These feed channels converge forwardly and serve to evenly admix the liquid fertilizer, insecticide or gas with the stream of water at said junction 23, the latter having regulated reduced pressure effect or suction which draws minute steady streams from the contents of the supply receptacle (not shown) and thoroughly admixes same in direct and even proportion corresponding with any variation in pressure of the stream of water provided by the souce of water supply.

A vacuum gauge 31 is provided in connection with the passage 29 and a positive pressure gauge 32 is connected with the water supply channel in the casing by which the operation of the apparatus can be judged by an attendant from time to time. The construction of my improved mixing unit permits ready changing of the filler B to provide any desired variation in diameter or sizes of the portions 20 and 22 of the water channel and liquid or gas feed passages 30 and thus enable the user to easily regulate the mixture of the liquid fertilizer, insecticide or gas to suit the pressure of the water stream and the strength of the admixture to be provided by the apparatus.

In accordance with the patent statutes I have described the principles of operation of my invention together with the construction thereof which I now consider to represent the best embodiment thereof but I desire to have it understood that the apparatus shown is only illustrative and that the invention can be carried into practice by other means and applied to uses other than those above set forth within the spirit thereof and the scope of the following claim.

I claim:

Jet pump means, comprising, a tubular casing having an inlet passage for a stream of water under pressure and a coupling removably connected to said casing and having a delivery passage, said casing and coupling forming a chamber therein, a filler removably held in said chamber by said coupling, said filler having an inlet duct connected with said inlet passage, forwardly expanding duct means connected by an abruptly enlarged junction with the orifice of said inlet duct, an annular space between the inner wall of said casing and the outer wall of said filler, a plurality of forwardly converging channels connecting said annular space with said expanding duct adjacent to said orifice, and a feed passage for fluid entering said annular space, said filler being removable from within said casing by the separation of said casing and coupling, whereby a complete set of mixing channels and ducts of different proportions may be substituted in said casing.

LEIGH L. ROSE.

REFERENCES CITED

The following references are of record in the file of this patent:

UNITED STATES PATENTS

| Number | Name | Date |
|---|---|---|
| 102,229 | Cowing | Apr. 26, 1870 |
| 1,036,871 | Matheson | Aug. 27, 1912 |
| 1,748,488 | McCabe | Feb. 25, 1930 |
| 2,128,170 | Stull | Aug. 23, 1938 |
| 2,230,201 | Hermann | Jan. 28, 1941 |
| 2,271,722 | Thornton | Feb. 3, 1942 |
| 2,381,589 | Hayes | Aug. 7, 1945 |

FOREIGN PATENTS

| Number | Country | Date |
|---|---|---|
| 203,345 | Great Britain | Sept. 1, 1923 |